(No Model.)
JOHN WAGNER.
BREAD KNIFE.
No. 343,509. Patented June 8, 1886.
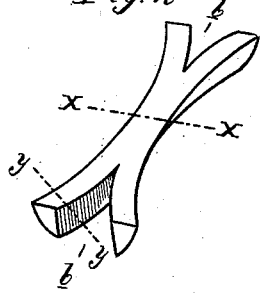
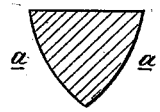
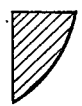
Attest:
John Schuman.
Inventor:
John Wagner.
by his Atty

UNITED STATES PATENT OFFICE.

JOHN WAGNER, OF DETROIT, MICHIGAN.

BREAD-KNIFE.

SPECIFICATION forming part of Letters Patent No. 343,509, dated June 8, 1886.

Application filed March 11, 1886. Serial No. 194,891. (No model.)

*To all whom it may concern:*

Be it known that I, JOHN WAGNER, of Detroit, in the county of Wayne and State of Michigan, have invented new and useful Improvements in Bread-Knives; and I do hereby declare that the following is a full, clear, and exact description thereof, reference being had to the accompanying drawings, which form a part of this specification.

This invention relates to improvements in knives for dividing dough into loaves; and it consists in the peculiar construction of the knife, as more fully hereinafter described and claimed.

In the drawings which accompany this specification, Figure 1 is a diagram illustrating the operation of my improved form of knife. Fig. 2 is a detached perspective of a knife constructed in accordance with my invention. Figs. 3 and 4 are cross-sections thereof on the lines $x$ $x$ and $y$ $y$, respectively.

The object of my invention is to construct a knife which permits the subdividing of a sheet of dough into pointed loaves without tearing or cutting the outer skin. To this end I give the knife in cross-section the form of a blunt wedge with convex faces, Fig. 3, which have such a degree of angularity that the knife, when operated in the usual manner, cannot cut through the dough, but simply divides it by crowding the material apart, as shown in Fig. 1. In this operation the skin of the dough remains perfectly unbroken and is carried down by the convex sides of the knife to form the sides of the loaf, and even if the pressure is carried so far as to entirely sever the dough the edge of the upper skin will be found joined to the edge of the lower skin. Fig. 2 illustrates the form of my improved knife, the central portion of which is in cross-section in the form of a blunt wedge, as best shown in Fig. 3, and bifurcated at each end. It is unnecessary to have both faces of the knife formed in the described manner where one side of the knife merely cuts off some portion of scrap, as it does in the angle $b$ in Fig. 2. Here the usual straight face is preferably preserved to facilitate the cutting out of the scrap.

I do not claim, broadly, a knife having in cross-section the form of a blunt wedge, for I am aware that such has been proposed.

What I claim as my invention is—

A dough-knife the central portion of which is in cross-section in the form of a blunt wedge and bifurcated at each end, as shown, one face of each bifurcation being convex and the other straight and constructed to cut out the scrap, substantially as described, and for the purpose specified.

JOHN WAGNER.

Witnesses:
H. S. SPRAGUE,
EDMOND J. SCULLY.